(12) United States Patent
Freud et al.

(10) Patent No.: US 7,912,777 B2
(45) Date of Patent: Mar. 22, 2011

(54) SYSTEM AND METHOD FOR USING CASH REBATES

(75) Inventors: Aliza Freud, Maplewood, NJ (US); Christine Lynch, Scarsdale, NY (US); Dee McBride, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1119 days.

(21) Appl. No.: 10/708,592

(22) Filed: Mar. 12, 2004

(65) Prior Publication Data

US 2005/0203824 A1    Sep. 15, 2005

(51) Int. Cl.
*G06Q 40/00* (2006.01)
(52) U.S. Cl. .......................................... 705/37; 705/35
(58) Field of Classification Search ............... 705/35–45
See application file for complete search history.

(56) References Cited

U.S. PATENT DOCUMENTS

| | | | |
|---|---|---|---|
| 5,025,372 A | 6/1991 | Burton et al. |
| 5,056,019 A | 10/1991 | Schultz et al. |
| 5,128,752 A | 7/1992 | Von Kohorn |
| 5,200,889 A | 4/1993 | Mori |
| 5,202,826 A | 4/1993 | McCarthy |
| 5,233,514 A | 8/1993 | Ayyoubi et al. |
| 5,287,268 A | 2/1994 | McCarthy |
| 5,483,444 A | 1/1996 | Heintzeman et al. |
| 5,734,838 A | 3/1998 | Robinson et al. |
| 5,774,870 A | 6/1998 | Storey |
| 5,794,219 A | 8/1998 | Brown |
| 5,806,045 A | 9/1998 | Biorge et al. |
| 5,905,975 A | 5/1999 | Ausubel |
| 5,907,831 A | 5/1999 | Lotvin et al. |
| 5,915,244 A | 6/1999 | Jack et al. |
| 5,923,016 A | 7/1999 | Fredregill et al. |
| 5,937,391 A | 8/1999 | Ikeda et al. |
| 5,983,205 A | 11/1999 | Brams et al. |
| 6,009,411 A | 12/1999 | Kepecs |
| 6,009,412 A | 12/1999 | Storey |
| 6,012,045 A | 1/2000 | Barzilai et al. |
| 6,041,309 A | 3/2000 | Laor |
| 6,061,660 A | 5/2000 | Eggleston et al. |
| 6,101,484 A | 8/2000 | Halbert et al. |
| 6,138,911 A | 10/2000 | Fredregill et al. |
| 6,178,408 B1 | 1/2001 | Copple et al. |
| 6,243,688 B1 | 6/2001 | Kalina |

(Continued)

OTHER PUBLICATIONS

"My Auction Home", http://sweeps.marketsystems.net/vip/auctions/myauction.html, Jan. 14, 2002, 1 page.

(Continued)

*Primary Examiner* — Jagdish N Patel
*Assistant Examiner* — Kevin Poe
(74) *Attorney, Agent, or Firm* — Snell & Wilmer L.L.P.

(57) ABSTRACT

The present invention provides a system and method for facilitating a bid transaction over a computerized network using a rewards account balance from any type of cash rewards program. In an exemplary embodiment of the present invention, a participant applies rewards from their rewards account to bid on items in a closed online auction over a computerized network such as the internet. The online auction is open only to participants of a sponsoring or participating cash rewards program and only bids made with accumulated cash rewards are accepted. Further, the present invention provides a system and method for facilitating online management of a rewards account by the participant.

13 Claims, 6 Drawing Sheets

U.S. PATENT DOCUMENTS

| | | | |
|---|---|---|---|
| 6,251,017 B1 | 6/2001 | Leason et al. | |
| 6,267,672 B1 | 7/2001 | Vance | |
| 6,334,111 B1 | 12/2001 | Carrott | |
| 6,336,098 B1 | 1/2002 | Fortenberry et al. | |
| 6,370,514 B1 | 4/2002 | Messner | |
| 6,532,448 B1 | 3/2003 | Higginson et al. | |
| 6,574,606 B1 | 6/2003 | Bell et al. | |
| 6,578,012 B1 | 6/2003 | Storey | |
| 6,584,448 B1 | 6/2003 | Laor | |
| 6,594,640 B1 | 7/2003 | Postrel | |
| 6,601,761 B1 | 8/2003 | Katis | |
| 6,721,743 B1 | 4/2004 | Sakakibara | |
| 6,748,366 B1* | 6/2004 | Hurwitz et al. | 705/53 |
| 7,155,411 B1* | 12/2006 | Blinn et al. | 705/40 |
| 2001/0032170 A1 | 10/2001 | Sheth | |
| 2001/0034635 A1 | 10/2001 | Winters | |
| 2001/0037241 A1 | 11/2001 | Puri | |
| 2001/0049625 A1 | 12/2001 | Mowry | |
| 2001/0054003 A1 | 12/2001 | Chien et al. | |
| 2001/0056395 A1 | 12/2001 | Khan | |
| 2002/0002495 A1* | 1/2002 | Ullman | 705/21 |
| 2002/0010621 A1 | 1/2002 | Bell et al. | |
| 2002/0035536 A1 | 3/2002 | Gellman | |
| 2002/0062249 A1* | 5/2002 | Iannacci | 705/14 |
| 2002/0065757 A1 | 5/2002 | Lam | |
| 2002/0065826 A1 | 5/2002 | Bell et al. | |
| 2002/0069150 A1* | 6/2002 | Ni | 705/36 |
| 2002/0077890 A1* | 6/2002 | LaPointe et al. | 705/14 |
| 2002/0095365 A1 | 7/2002 | Slavin et al. | |
| 2002/0111859 A1 | 8/2002 | Sheldon et al. | |
| 2002/0111893 A1 | 8/2002 | Shifrin-Cassidy | |
| 2002/0116316 A1* | 8/2002 | Griffiths | 705/37 |
| 2002/0120501 A1 | 8/2002 | Bell et al. | |
| 2002/0128916 A1 | 9/2002 | Beinecke | |
| 2002/0143683 A1 | 10/2002 | Taylor | |
| 2002/0156668 A1 | 10/2002 | Morrow et al. | |
| 2002/0161630 A1 | 10/2002 | Kern et al. | |
| 2002/0169672 A1 | 11/2002 | Barnhart | |
| 2002/0198803 A1* | 12/2002 | Rowe | 705/35 |
| 2003/0004799 A1 | 1/2003 | Kish | |
| 2003/0041002 A1 | 2/2003 | Hao et al. | |
| 2003/0055729 A1 | 3/2003 | Bezos et al. | |
| 2003/0065642 A1 | 4/2003 | Zee | |
| 2003/0074300 A1 | 4/2003 | Norris | |
| 2003/0111531 A1 | 6/2003 | Williams | |
| 2003/0195838 A1 | 10/2003 | Henley | |
| 2003/0208397 A1 | 11/2003 | VanDusen | |
| 2003/0212589 A1 | 11/2003 | Kish | |
| 2003/0225678 A1* | 12/2003 | Understein | 705/37 |
| 2004/0015394 A1* | 1/2004 | Mok et al. | 705/14 |
| 2004/0039644 A1 | 2/2004 | Postrel | |
| 2004/0122736 A1* | 6/2004 | Strock et al. | 705/14 |
| 2004/0254891 A1* | 12/2004 | Blinn et al. | 705/67 |
| 2004/0260645 A1* | 12/2004 | Yakos | 705/39 |
| 2004/0260647 A1* | 12/2004 | Blinn et al. | 705/41 |
| 2005/0197919 A1* | 9/2005 | Robertson | 705/26 |
| 2005/0246541 A1* | 11/2005 | Ginter et al. | 713/176 |
| 2006/0259364 A1* | 11/2006 | Strock et al. | 705/14 |
| 2007/0118461 A1* | 5/2007 | Arkes | 705/37 |
| 2008/0021808 A1* | 1/2008 | Edlund et al. | 705/37 |

OTHER PUBLICATIONS

Emailthatcounts Home Page, http://www.emailthatcounts.com, Jan. 14, 2002, 1 page.

Mobil Rewards Program, http://www.mobilerewards.com/index/jsp? AGE=faq, Jan. 14, 2002, 2 pages.

Points Loytalty Program@edeal.com, http://marketplace.edeal.com/cgi-bin/ncommerce3/ExecM cr /st tic/ip int.d2w/rep rt?wl=151, Jan. 11, 2002, 4 pages.

EmasOnline.com—EmasPoints Guidelines, http://www.emasonline.com/eonline/emasguidelines. sp?p gec t=sh p, Jan. 14, 2002, 1 page.

Employee Loyalty Programme by NetCarrots Loyalty Services: A Powerful Management Tool, http:www.netcarrots.net/net/solutions/elp/ pmt.jsp, Jan. 11, 2002, 1 page.

Online Business discover customer loyalty is easily bought, http://www.dr ke.edu/journalism/InfinetWorld/loyal.html, Jan. 11, 2002, 3 pages.

* cited by examiner

SYSTEM AND METHOD FOR USING CASH REBATES

FIELD OF INVENTION

The present invention relates generally to spending currency from a participant's cash rebate or rewards account from a financial instrument such as a charge card, and more particularly, to a system and method which allows a participant of a cash rebate or rewards program to facilitate bids within a closed online auction.

BACKGROUND OF INVENTION

Traditional rewards (e.g., incentive award, frequency reward, etc.) programs have been around for years. Rewards programs are typically used to help businesses develop and maintain participant rewards and are used as marketing tools to develop new clientele. A frequent flyer program is an example of a typical rewards program, where the more the participant uses a particular airline or group of affiliated airlines the more frequent flyer miles the participant earns. After accumulating frequent flyer miles, the participant may choose to redeem those miles for up-grades in service or free airline tickets. Various forms of these programs have developed over the years, ranging from programs such as "buy 9 get one free" punch cards to more sophisticated credit card rewards systems, where participants are awarded points or cash rebates for using a particular transaction card and/or by using a transaction card with particular merchants or vendors. As competition in various markets increased, companies sought ways to expand rewards programs to appeal to a broader cross-section of potential participants. One way this was accomplished was by developing strategic partnerships and affiliations with other business sectors. For example, hotel chains, airlines and rental car agencies developed rewards program partnerships and affiliations; credit and transaction card companies also joined in to promote a more comprehensive and appealing rewards program. These programs have been successful, but again were limited in that the rewards could only be redeemed within the network of companies in the rewards program affiliation or partnership. For example, U.S. Pat. No. 5,937,391 ('391) owned by Fujitsu Limited; U.S. Pat. Nos. 5,774,870 ('870) and 6,009,412 ('412) owned by Netcentives, Inc.; and U.S. Pat. No. 5,025,372 ('372) owned by Meridian Enterprises (all of which are hereby incorporated by reference) illustrate recent efforts to create more attractive rewards systems.

The '870 and '412 patents both relate to an online, interactive frequency and award redemption program which immediately awards and issues bonus points to a user's awards account in response to that user's online purchase of merchandise. In other words, submission of a purchase order form during an online session results in the calculation and addition of points to an enrolled user's account as well as the display of current account information. The user is then immediately permitted to redeem any or all of the award points in the user's account, including currently awarded points, in that same online session. This system is specifically directed to expediting the award and redemption of points for product rather than cash rewards that can be used to bid on products or services in an online auction. Further, this invention is limited to redeeming points within a redemption network of merchants who accept points.

The '372 patent generally relates to an incentive award program which allocates monetary amounts of credit based on a participant's performance of a designated level of achievement. The monetary amounts can be withheld and/or adjusted by a sponsoring company. Although this system allows for the crediting of a monetary value to a credit instrument, it is limited in that the participant is not able to interact over a computerized network with this system so as to effect a real-time transaction or to affect a real time credit to a credit instrument.

Although many of these programs have been successful in developing participant rewards and incenting participants to act, they have presented participants with limited opportunities to redeem rewards for the products of their choice or have provided participants with limited accessibility and control of their rewards account. Over the past several years, online auctions have become more of a standard for conducting online commerce. Market forces, as demonstrated by the success of online auctions such as eBay®, are looking toward the online auction format to purchase a wide variety of products, services, and experiences at the absolute lowest prices possible. Therefore, a need exists in this industry for a program that provides cash reward participants with an exclusive means to shop and redeem cash rewards toward the purchase of products, services, and experiences at the lowest possible price within the format of an online auction, while offering real-time control of one's cash reward account.

SUMMARY OF INVENTION

In general, the present invention overcomes the limitations and problems of the prior art by providing a system and method for facilitating a bid transaction over a computerized network using a rewards account balance from any type of cash rewards program. One exemplary embodiment of the present invention is directed to a method for allowing a participant to apply rewards to facilitate a bid in an online auction over a computerized network, such as the internet which includes the general steps of: (1) allowing a participant to use his or her participating charge card number which is associated with a rewards program to register for online auction membership, (2) allowing the participant to place a bid of a cash amount that is not in excess of his or her rewards account balance on an auction item; (3) determining the winning bid and invoking a process to deduct the bid amount from the balance of the rewards account associated with the participant's designated charge card account; and (4) settling with the merchant for the cost of the auction item.

An exemplary system and method of the present invention is generally described herein, in terms of a registration phase, an account maintenance phase, a transaction phase, and a transaction settlement phase. During the registration phase, a rewards program participant wishing to participate in an online auction enters identity and rewards account information in order to validate the eligibility of the rewards program and verify the identity of the rewards program participant. For example, a rewards program participant enters information, such as the name of the participant and the credit card number and expiration date relating to the account for which the rewards program is affiliated, onto a web page. Additional information such as social security number, billing address, three-digit card verification code, PIN number, and the like may be used to verify the participant's identity. Upon entering and submitting the information, the data is compared to that of the account manager's database. When the data is verified, the participant is directed to a webpage which allows them to select a user name and password, both of which are used to enter the online auction. Finally, all of the information except the credit card number is transmitted to the auction system where it is maintained in order to facilitate auction bids.

During the account management phase, the rewards system is queried for the rewards account balance as well as the reward account history. This information is presented to the participant through a webpage which is made accessible to the participant upon logging onto the auction system and selecting a hyperlink to view rewards account details. Presenting this information enables an auction participant to verify his or her rewards account balance prior to entering an auction bid. A participant's cash rewards balance may also be displayed within each webpage the participant visits after logging onto the auction. This is especially helpful for a participant who is simultaneously participating in more than one auction because the balance is adjusted after the auction closes and the bid is processed to reflect an available bid balance.

In another embodiment of the present invention, the auction participant may choose to add or remove additional participating rewards accounts in order to increase or decrease the amount of cash rewards available for auction bid. For example, an online auction for redeeming cash rewards may include any number of account managers offering similar cash rewards programs to their participants. Various account manager participants may consist of any type of financial account provider who offers cash rewards as incentives and may include a variety of instruments such as credit cards, merchant cards, gas cards, gift cards, airline rewards, and the like.

The account management phase further includes the process of presenting a history of the participant's auction activity after logging onto the auction system and selecting an "auction history" hyperlink. The participant's account history may include information such as dates and descriptions of items the participant has bid on, the cash rewards amount bid during each auction, winning bid amounts, current bid status, and the like.

During the transaction phase, a rewards program participant desiring to spend accumulated cash rewards generally selects one or more items (products or services) to bid on from the online auction. The online auction may be run by, sponsored by or associated with the financial account manager. In an alternative embodiment, the online auction is a pre-existing online auction wherein the auction is not operated by the financial account manager. The participant enters a bid amount and selects "Place Bid", thereby invoking a process to verify the bid amount. Before the bid transaction is allowed to go forward, the auction middleware (which generally comprises software and/or hardware which allows two or more computing systems to exchange data) queries the account manager to verify that sufficient cash rewards are available in the participant's rewards account. The auction middleware also queries the auction system to verify that the bid amount exceeds that of the highest bid and ensures that a minimum bid has been met. A charge authorization system is then accessed to compare the transaction details with account information stored in the participant's rewards account.

When the auction closes at a time that is predetermined by either the auction system, account manager, merchant or participant, the auction middleware queries the auction system for the highest bid. If there is an auction winner, the system deducts the bid amount from the participant's rebate account.

Additional exemplary embodiments relating to the transaction phase contemplate, inter alia, (1) use of a temporary account number ("secondary transaction number") instead of a physical transaction card number, (2) integration of a third party redemption network, (3) integration with external cash rewards programs or commercial transaction networks, (4) transfer of cash rewards from one party to another, (5) transfer of cash rewards to different transaction instruments, (6) consolidating rewards onto a single transaction account, or (7) facilitating use of the system by a minor by implementing a parent approval or notification system.

Further, the transaction phase may occur over any computerized network via any suitable user interface system (e.g., internet, phone, wireless, POS terminal, etc.). As used herein, the term "computerized network" includes, but is not limited to any network implemented in the form of a wire-based network (including telephone and cable lines), or as a wireless network (including satellite or cellular networks).

As with traditional purchases using transaction cards, the transaction card details (e.g., transaction card number, expiration date, etc) are provided to the merchant or shopping network system to complete the transaction. In the case of the online auction, this information is provided by the system querying the account manager for data relating to the rewards account and querying the auction system for data relating to the merchant. However, the present invention also contemplates an auction system where the participant is required to enter card information after winning an auction item in order to validate the transaction. In either situation, the merchant processes the transaction card number (and associated transaction details) for authorization and settlement is performed as it is generally done with routine transaction card purchases.

During the transaction settlement phase, the accounts receivable system reconciles the charge for the particular transaction with a credit from the participant's rewards account. In one embodiment, for each charge where the participant elected to pay with rewards points, there will be a corresponding and offsetting charge to the account. In another embodiment, there may be a credit on a participant's rewards account without a corresponding transaction charge, such as is the case with a gift certificate embodiment, where the rewards have been purchased in the form of a gift certificate; or stored on or downloaded to a stored value card or smart card.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

In general, the present invention uniquely integrates a rewards program and the financial transaction systems of a transaction account provider ("account manager") to more effectively use cash rewards to facilitate transactions within an online auction. Specifically, the system and methods described herein, allow a participant to utilize cash rewards (such as cash rewards to a participant in the American Express Blue Cash® Program) to facilitate bidding on items (products, services, experiences, etc.) within an auction, wherein the auction may be limited to members of the rewards program. This system not only provides a mechanism for redeeming cash rewards in an online auction, but it also comprises existing account manager settlement systems such as accounts receivable and accounts payable processes to facilitate transaction processing following a winning bid.

The participant, as used throughout this application, should be understood to mean any individual, business, entity, software and/or hardware that desires to use any cash rewards account to facilitate a transaction as a result of a winning auction bid. The participant may also be known as, and occasionally referred to as, a "participant," "cardholder," "user," "cardmember," or the like. In an exemplary embodiment, although the participant may be an existing credit card holder, this is not required. Although the participant will generally be enrolled in a rewards program, such as the American Express Blue Cash® Program, and will have accumulated cash rewards, this is also not required.

Any rebate system may be incorporated into the present invention. In an exemplary rebate system, the rebate may be based upon the percentage of a transaction value, the percentage of multiple transactions, the number of transactions, the number of transactions at a certain merchant or group of merchants, a percentage of transaction values at a certain merchant or group of merchants, any algorithm or any other subset or multiple of transaction, demographic or other information. The rebate may be automatically issued as an annual statement credit. In this system, the rebate may be issued two months after the participant's individual anniversary date. In other embodiments, the rebate may be issued in real-time, after each applicable transaction, weekly, monthly or any other time period. Alternatively, the rebate may remain in a participant's temporary account (or the dollar amount associated with the participant's account number) until the participant enters data into a web page, sends an email or telephones a customer service representative to request that the rebate be applied to the participant's usable account. The participant may also be able to request a statement credit or a stored value card that can be used at any merchant or subset of merchants. In one embodiment, the requests are limited to at least $20, otherwise the participant may request any whole dollar increment up to the maximum amount they have in their bank.

As used herein, a "merchant" is any individual, business, entity, software and/or hardware that transacts with the participant through the online auction. The merchant may be a third party who interacts with the online auction or the account manager through an existing shopping gateway, such as Amazon.com® or ToysRus.com®.

Transaction or transaction card numbers are account numbers that are used to facilitate a cash payment from one party to another. As used herein, a "transaction card", "account" or "account number" may include any device, code, number, letter, symbol, digital certificate, smart chip, digital signal, analog signal, biometric or other identifier/indicia suitably configured to allow the consumer to access, interact with, or communicate with the system such as, for example, one or more of an authorization/access code, personal identification number (PIN), Internet code, other identification code, and/or the like which may optionally be located on or associated with a rewards card, charge card, credit card, debit card, prepaid card, telephone card, smart card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. A participant account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the participant. A merchant account number may be, for example, any number or alpha-numeric characters that identifies a particular merchant for purposes of card acceptance, account reconciliation, reporting, or the like.

The account manager as defined herein includes any individual, business, group or affiliation of individuals, businesses or other entities, software and/or hardware, that facilitates the financial transaction system processes of the present invention. The account manager may also be known as and occasionally referred to herein as "card provider," "card issuer," or the like. It should be appreciated that although the figures depict the auction middleware in communication with only one account manager system, the auction middleware could be in communication with multiple account managers and a single account manager might comprise many subcomponents, subsystems and/or a variety of business entities.

The auction system as defined herein includes any individual, business, group or affiliation of individuals, businesses or other entities, software and/or hardware, that facilitates an online auction. The auction may be open to account holders of participating account managers. The auction system includes an auction where transactions between the auction participant and the merchant are in the form of cash rewards provided by the participating account manager(s). The auction system may also be used to describe the human and/or organizational entities facilitating the auction as well as hardware and software devices and services used in that process.

The rewards program may be any computer system for managing, tracking, and/or reporting rewards program information. As previously described, the traditional rewards systems allow participants to accumulate points in a rewards program account and to then redeem points for merchandise. For example, the American Express Blue Cash® system allows participants to accumulate cash rewards by using their transaction card (American Express® card) to make purchases or by shopping with affiliated merchants. The rewards program, as contemplated by the present invention, may be a stand-alone system or may be affiliated or integrated with other rewards programs or transaction networks. The component parts of an exemplary rewards program generally include computer server and database systems for processing and storing rewards program account information. As depicted in FIGS. 2-6, the rewards program system may exist within the account manager's systems. Alternatively, the rewards program system may be a separate rewards program managed by a third party.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, a user's or participant's computer may include an operating system (e.g., Windows NT, 95/98/2000, OS2, UNIX, Linux, Solaris, MacOS, etc.) as well as various conventional support software and drivers typically associated with computers. The user or participant computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols" (1998); "Java 2 Complete", various authors, (Sybex 1999); Deborah Ray and Eric Ray, "Mastering HTML 4.0" (1997); and Loshin, "TCP/IP Clearly Explained" (1997) and David Gourley and Brian Totty, "HTTP, The Definitive Guide" (2002), the contents of which are hereby incorporated by reference.

The various system components may be independently, separately or collectively suitably coupled to the network via data links which include, for example, a connection to an Internet Service Provider (ISP) over the local loop as is typically used in connection with standard modem communication, a cable modem, Dish networks, an ISDN, a Digital Subscriber Line (DSL), or various wireless communication methods. See, e.g., Gilbert Held, "Understanding Data Communications" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash., or any other suitable database product. Moreover, the databases may be organized in any suitable manner, for example, as data tables or lookup tables. Each record may be a single file, a series of files, a linked series of data fields or any other data structure.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users or participants. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Intervase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user or participant. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise" (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Each participant may be equipped with a computing device in order to interact with the system and facilitate on-line commerce transactions. The participant has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the invention. The system may include a computing center with a main frame computer. However, the computing center may be implemented in other forms, such as a mini-computer, a PC server, a network of computers located in the same or different geographic locations, or the like. Moreover, the system contemplates the use, sale or distribution of any goods, services or information over any network having similar functionality described herein.

The merchant computer and the account manager computer may be interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the participant and issuing bank. In an exemplary implementation, the electronic commerce system is implemented as computer software modules loaded onto the participant computer and the banking computing center. The merchant computer may not require any additional software to participate in the online commerce transactions supported by the online commerce system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

For more information on loyalty systems, transaction systems, electronic commerce systems and digital wallet systems, see, for example, U.S. patent application Ser. No. 09/836,213, filed on Apr. 17, 2001 by inventors Voltmer, et al. and entitled "System And Method For Networked Loyalty Program"; U.S. Continuation-In-Part patent application Ser. No. 10/027,984 was filed on Dec. 20, 2001 by inventors Ariff, et al. and entitled "System And Method For Networked Loyalty Program"; U.S. Continuation-In-Part patent application Ser. No. 10/010,947 filed on Nov. 6, 2001 by inventors Haines, et al. and entitled "System And Method For Networked Loyalty Program"; U.S. Continuation-In-Part patent application Ser. No. 10/084,744 filed on Feb. 26, 2002 by inventors Bishop, et al. and entitled "System And Method For Securing Data Through A PDA Portal"; the Shop AMEX™ system disclosed in U.S. Patent Application Ser. No. 60/230,190 filed Sep. 5, 2000; the MR as Currency™ and Loyalty Rewards Systems disclosed in U.S. Patent Application Ser. No. 60/197,296 filed on Apr. 14, 2000; U.S. Patent Application Ser. No. 60/200,492 filed Apr. 28, 2000; U.S. Patent Application Ser. No. 60/201,114 filed May 2, 2000; the digital wallet system disclosed in U.S. patent application Ser. No. 09/652,899 filed Aug. 31, 2000; the stored value card disclosed in U.S. patent application Ser. No. 09/241,188 filed Feb. 1, 1999; the system for facilitating transactions using secondary transaction numbers disclosed in U.S. patent application Ser. No. 09/800,461 filed Mar. 7, 2001; and also in related U.S. Provisional Patent Application Ser. No. 60/187,620 filed Mar. 7, 2000; U.S. Provisional Patent Application Ser. No. 60/200,625 filed Apr. 28, 2000; and U.S. Provisional Patent Application Ser. No. 60/213,323 filed May 22, 2000, all of which are herein incorporated by reference.

Other examples of online membership reward systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; which are hereby incorporated by reference.

Referencing the online aspect of an exemplary embodiment of this invention, each participant is equipped with a computing system to facilitate online commerce transactions in the form of auction bids. The computing units may be connected with each other via a data communication network. The network is a public network and assumed to be insecure and open to eavesdroppers. In the illustrated implementation, the network is embodied as the Internet. In this context, the computers may or may not be connected to the Internet at all times. For instance, the participant's computer may employ a modem to occasionally connect to the Internet, whereas the account manager's computing center might maintain a permanent connection to the Internet. It is noted that the network may be implemented as other types of networks, such as an interactive television (ITV) network.

Additional online user interface embodiments for facilitating transactions provide for:
(1) the integration of the merchant website with the online auction website to provide a seamless environment and "look and feel" between the merchant's product description web page and the account manager's "bid with rewards" web page.
(2) the use of an online digital wallet, as described in U.S. Ser. No. 09/652,899 filed on Aug. 31, 2000 (incorporated herein by reference), where participant account information is stored online and is integratable with the account manager features and the online merchant's payment features. In this embodiment an online wallet may be periodically loaded with rewards as a currency credit. The online wallet may or may not be associated with a participant's financial transaction account.

The present invention is directed to a system and method for facilitating a bid transaction over a computerized network using a rewards account balance from any type of cash rewards program. The system and method generally include a registration phase, an account maintenance phase, a transaction phase, and a transaction settlement phase. These general phases are more particularly described below with reference to the various drawing figures.

Figure 1:
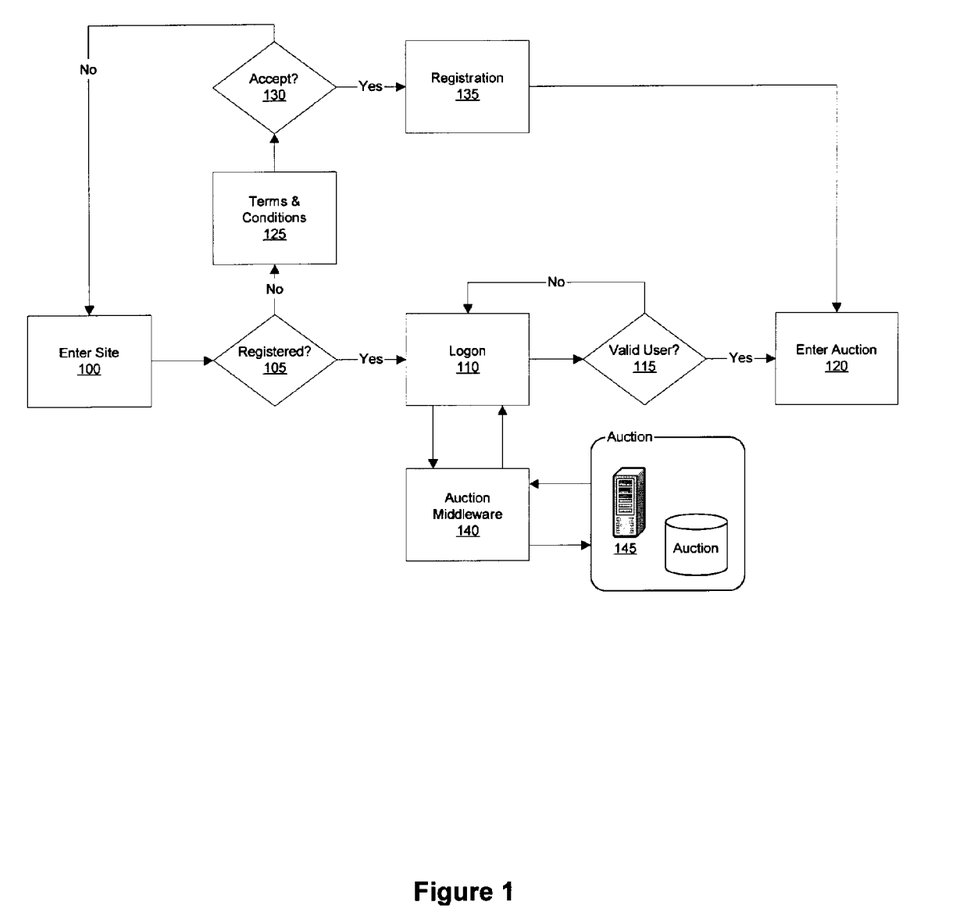
FIG. 1 is a flow chart illustrating the registration and log on steps within an exemplary embodiment of the present invention.

Registration Phase: FIG. 1 is a flow chart illustrating the registration and log on steps that are carried out in one exemplary embodiment of the present invention. While the present invention may be applicable to open or closed systems, the following embodiment discloses a closed system. In order to participate in an auction limited only to members of one or more participating rewards programs, the rewards program participant registers for membership to the closed auction. Upon entering the auction site 100 the participant is invited to register 105 for membership to the online auction or to log on 110 to the on-line auction if the participant is already registered. If the participant elects to register for membership, the participant is presented with the terms and conditions 125 of the closed auction and is then asked to accept 130 those terms and conditions. If the participant does not agree to the terms and conditions 125 and therefore elects not to proceed with registration 135, the participant is directed back to the auction site entry point 100. If the participant agrees with the terms and conditions 125 and therefore elects to proceed with registration 135, the participant is presented with a registration form where the participant supplies information which may include the participant's financial transaction account information, social security number, address and other information used to validate the participant's identity and to facilitate auction participation using cash rewards from the participant's cash rewards account.

If a participating rewards participant is already registered, they are presented with a logon screen 110 where they are asked to enter a valid username and password. Auction middleware 140 is used to enable selection and verification of valid usernames and passwords for participating rewards participants and is explained in further detail with reference to FIG. 2. If a valid username and password are verified 115 then the rewards participant is allowed to enter auction 120. Conversely, if a valid username and password are not verified 115, then the participant is returned to logon screen 110 and allowed to resubmit their username and password for verification. The system may also check the participant age to determine if the participant is a minor. If the participant is a minor, the system may require additional information, verification, notification (e.g., page, phone call or email to parent) or other involvement by the parent or guardian.

Figure 2:
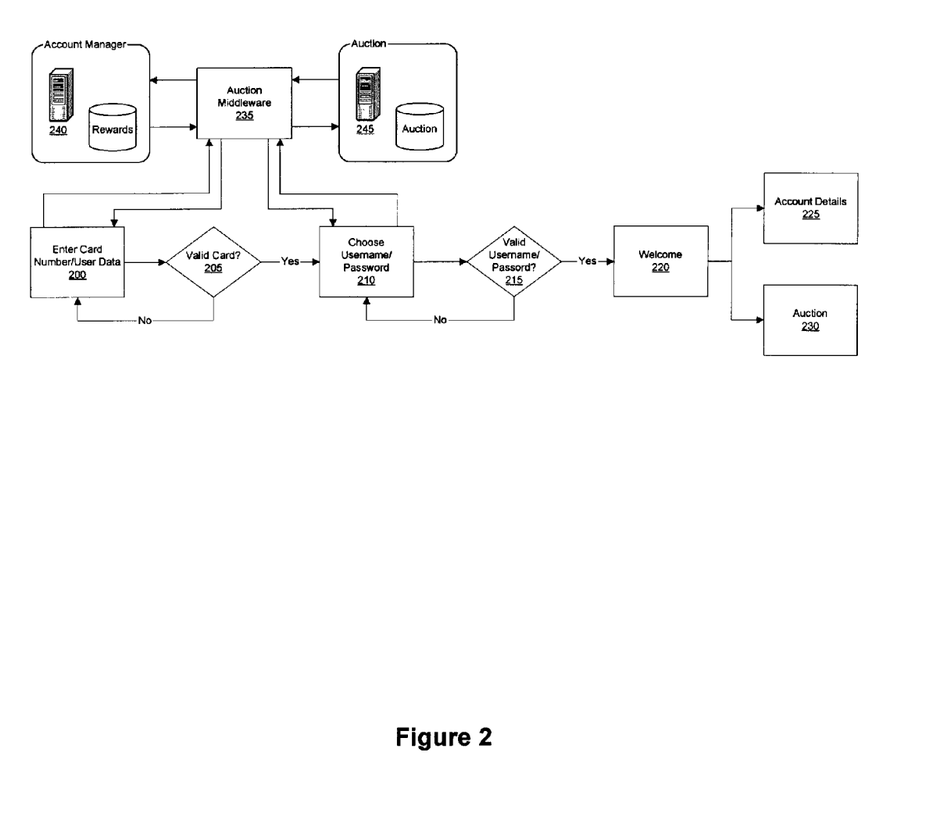
FIG. 2 is a flow chart illustrating a more detailed view of the registration steps within an exemplary embodiment of the present invention.

FIG. 2 is a flow chart illustrating a more detailed view of the registration steps involved in one exemplary embodiment of the present invention. An exemplary system of the present invention may comprise various subsystems and applications, some of which are part of the closed auction system 245, some of which are part of the financial transaction account system or account manager 240, and some of which are used to facilitate interaction between the auction system 245 and the account manager 240 such as auction middleware 235. One object of the registration process is to obtain data from the participant to verify the participant's identity and the participant's eligibility. It is also an object of the registration process to use the participant's data to facilitate bids that are made by the participant for certain products or services by applying a balance of the participants cash rewards as a bid against an auction item. As shown in the registration process depicted in FIG. 2, a participant is prompted to enter information 200 into a form which may include a qualifying credit card number along with other pertinent data used to validate the identity of the participant. Data entered into the form is transmitted to the auction middleware 235, which facilitates the transmission of data between the auction system 245 and the financial transaction account system or account manager 240. Validity and accuracy of the data entered by the participant is verified by the account manager 240. If the data is found to be inaccurate or incomplete 205, the participant is again presented with the registration data screen 200 to allow the participant an opportunity to re-enter the data. If the account manager 240 verifies that the data is valid, the participant is presented with a screen for entering information such as the participant's email address, and the participant may also select an option to elect to receive information via email, or may select to receive other elective information useful to either the participant or account manager. Further, the participant will be presented with a screen 210 and required to choose a username and password in order to enter the auction as a member.

The system may then request that the participant select one or more auction systems. In one embodiment, the system may allow selection of certain auction systems based upon the status or level of the participant. In another embodiment, the system may pre-select certain auction systems for certain participants or groups of participants. In another embodiment, the system may select all available auction systems for each participant or any combination of the foregoing embodiments.

The username and password are transmitted to the auction middleware 235, which then transmits any needed data to the selected auction system 245. In other words, the auction middleware may register the participant in one or more auction system as if the participant entered the auction website directly. The middleware 235 also confirms that the username and password are in an acceptable format and to ensure that the username and password have not already been assigned to another participant. If either the username or password is found to be in an unacceptable format, or if either is already assigned to a different participant upon verification 215, the participant is directed back to screen 210 to select a different username and password. Upon validating the username and password, the participant will be presented with a web page 220 acknowledging success of the registration process and welcoming them to the auction. Alternatively, web page 220 may be the home page for auction participants.

From this point, the participant may choose to view account details 235 which may include, but is not limited to, information such as a rewards account balance, an auction account history, and an offer to the participant to modify non-essential account data. The participant may also choose to enter an auction 230 to begin participating in the bidding process.

Figure 3:
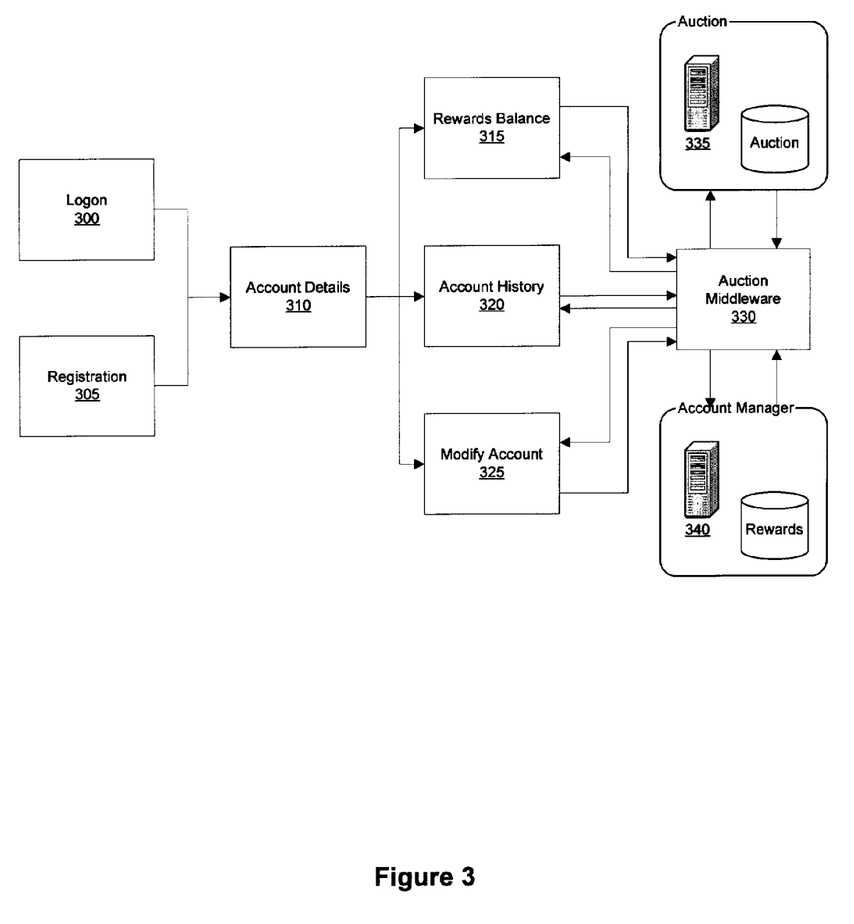
FIG. 3 is a flow chart illustrating an exemplary embodiment of the present invention where account information for the closed auction can be viewed and modified.

Account Maintenance Phase: FIG. 3 is a flow chart illustrating an exemplary embodiment of the present invention where account information for the auction can be viewed and modified. In this embodiment, the closed auction participant is able to view their rewards account balance and account history including their bid history and the rewards applied toward winning bids. The auction participant also has the ability to modify non-essential account data such as email address, mailing address, telephone numbers, election for email notifications from either the closed auction site or the account manager, and the like. The participant may choose to view account details 310 through either the logon page 300 or immediately following registration 305. The participant is presented with account options through the account details page 310 including a rewards account balance 315, an auction account history 320, and a page which allows the participant to modify auction account data 325. In the present embodiment of the invention, rewards account balance 315 is obtained by transmitting a request to the auction middleware 330, which queries the auction system 335 for the participant's rewards account data. The account data is then used by the auction middleware 330 to send a query to the account manager 340. The participant's rewards account balance is then transmitted to the auction middleware 330 and then to the participant's web browser page that recites rewards account balance 315. The participants account history 320 presents information relating to the participant's closed auction activity and may include a complete history of bids, bid amounts, a description of each product or service where the participant placed a bid, auction status, bid status, winning and loosing bids, and the like. Account history 320 is obtained by sending a request to the auction middleware 330, which queries the auction system 335. The data is then transmitted back through the auction middleware 330 and then to the participant's web browser page that recites account history 320. In order for the participant to modify account information 325, the participant is presented with information, which may be modified and obtained by querying the auction system 335 through the auction middleware 320. When the participant completes any modifications to the data and selects a hyperlink button to submit the changes, the data is transmitted to the auction middleware 330 where it is then transmitted to the auction system 335.

Figure 4:
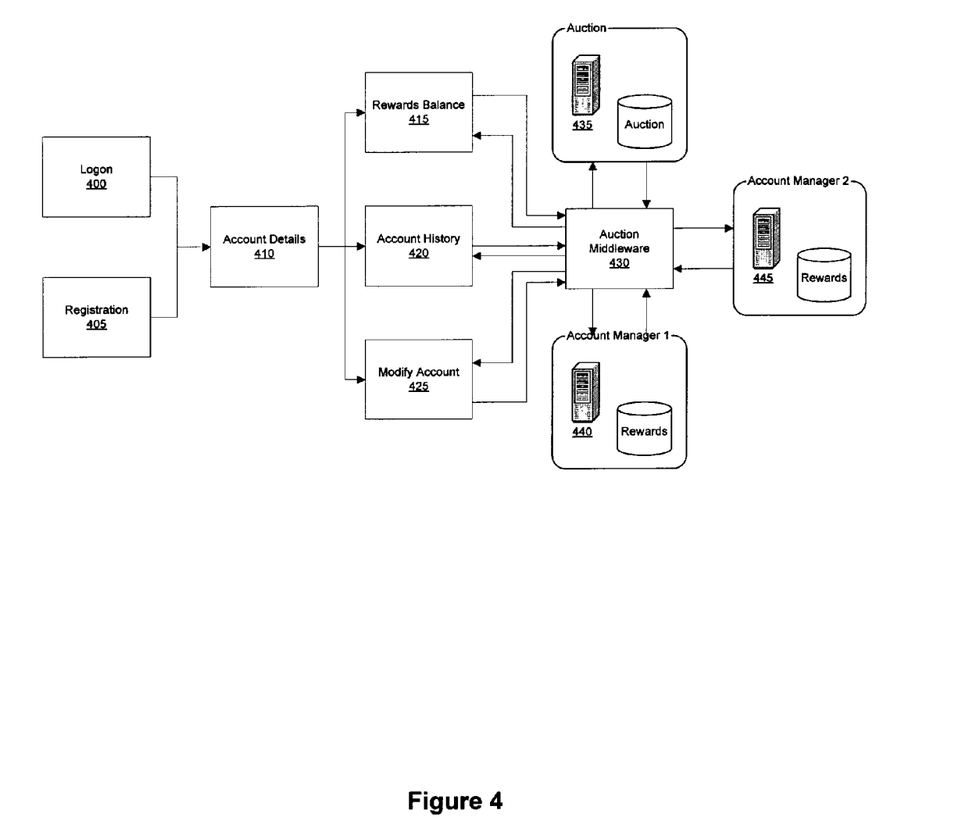
FIG. 4 is a flow chart illustrating another embodiment of the present invention where participation by multiple rewards program account managers is allowed.

FIG. 4 is a flow chart, which illustrates another exemplary embodiment of the present invention. As in FIG. 3, FIG. 4 illustrates how account information for the closed auction can be viewed and modified. However, it also illustrates a closed auction system where multiple account managers offering cash rewards programs can participate in the auction by allowing their rewards program participants to participate in the auction. In this embodiment, the participant's rewards balance 415 is obtained by transmitting a request to the auction middleware 430, which then transmits a query to the auction system 435 for data to identify the rewards program participant as well as the identity of the rewards program. This information is then used by the auction middleware 430 to query the appropriate account manager 440 or 445. The participant's rewards account balance is then transmitted to the auction middleware 430 and then to the participant's web browser page that recites the participant's reward balance 415.

Figure 5:
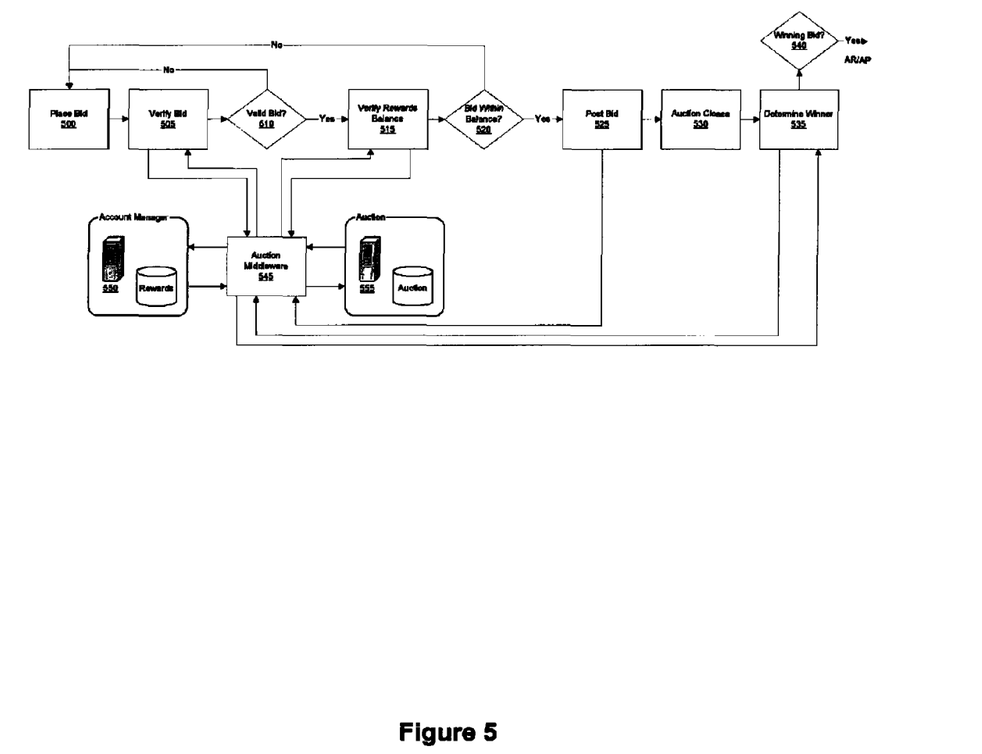
FIG. 5 is a flow chart illustrating the steps of placing a bid for an auction item within an exemplary embodiment of the present invention.

Transaction Phase: FIG. 5 is a flow chart illustrating the steps of placing a bid for an auction item in accordance with another exemplary embodiment of the present invention. The term "bid" is used herein to describe the process of offering a portion of a rewards account balance toward a product or service offered by a third party.

In the online auction, a participant may choose to place a bid 500 on an auction item. The ability to bid on an item may be restricted or limited by type of item, time period, level or status of the participant. For example, only gold account holders may bid on items greater than $1000 and they may only bid on weekdays after 5 p.m. The bid amount entered by the participant is then verified 505 by transmitting the bid amount to the auction middleware 545 where the auction system 555 is queried to verify that the bid amount, for example, (1) exceeds that of the previous high bid and (2) exceeds a minimum bid amount that may have been placed on the item by either the merchant or auction manager. If the bid is determined to be invalid 510 for failing to meet these requirements, the participant is again presented with an option to place a bid 500 where the participant may re-enter a bid amount. The bid amount is again verified as described above until the bid requirements are met. When the bid amount is determined to be valid 510, the participant's rewards account balance is verified 515 by transmitting a request to the auction middleware 545. The auction middleware 545 queries the account manager system 550 for the participant's rewards account balance to verify that the bid amount falls within the rewards account balance 520.

In one embodiment, the participant's rebate balance may not be adjusted unless he or she wins the auction. Bid amounts may not be deducted from the rebate account or placed in any type of pending status. The participant may be able to bid up to the entire balance on multiple auctions. However, in one exemplary embodiment, the participant may only win the auction that closes with the participant as the highest bidder and processes the bid prior to the other auctions.

In an alternative embodiment, bid amounts may be deducted or placed in a pending status. During verification of the rewards account balance 515, the auction system 555 is also queried in order to locate any pending bids in other auctions that the participant might have previously placed. If other pending bids are found, the sum of those bids may be deducted from the amount determined to be available for bid. For example, a participant might have a rewards account balance of $80.00 and has placed a bid in an auction in the amount of $60.00. If the same participant then places a bid of $30.00 in another auction while the subsequent bid is pending, the new bid will be determined to be outside of the available rewards balance in step 520. This step ensures that a participant has available funds in their rewards balance to cover all of their posted bids. Therefore, if the originally placed bid amount or combined bid amount exceeds the amount of available rewards balance 520, the participant is again presented with an opportunity to place a bid 500 where he or she may choose to enter a lower bid. If the originally placed bid amount or combined bid amounts does fall within the rewards account balance in step 520, then the participant's bid is transmitted to the auction system middleware 545, which then transmits the bid amount to the auction system 555 which then posts the bid 525. It is contemplated that the steps of validating the bid amount as well as validating the rewards account balance may be combined into a single step and does not necessarily need to be sequential as described above.

Figure 6:
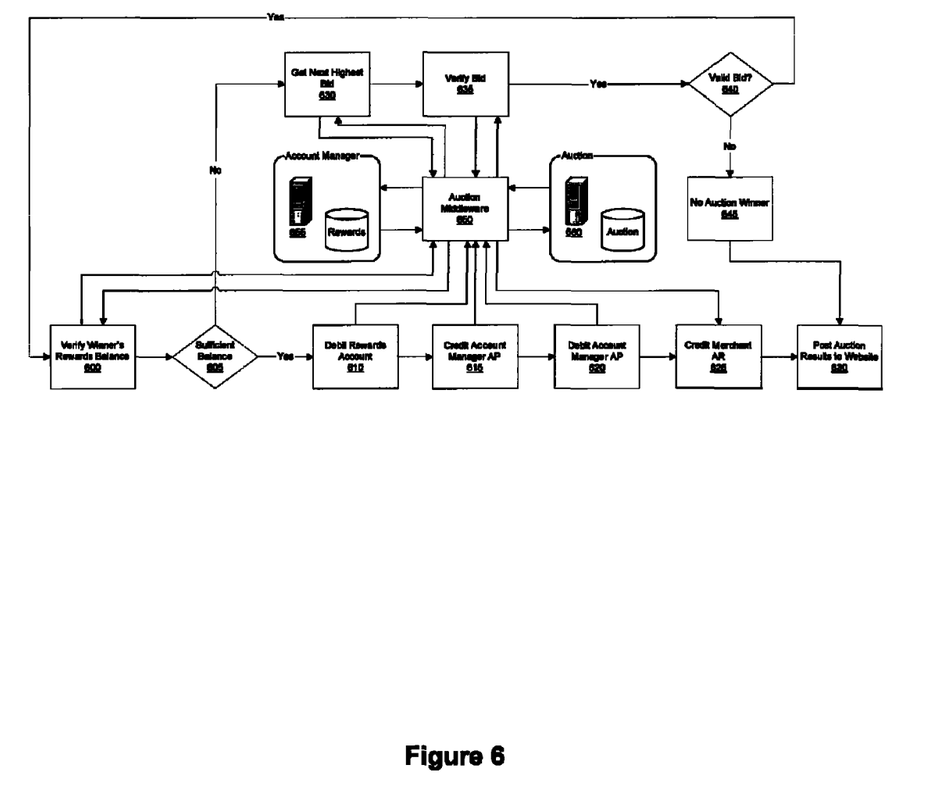
FIG. 6 is a flow chart illustrating the transaction settlement phase of an exemplary embodiment of the present invention where the participant's rewards account is debited and the merchant account is credited.

At a time period determined by either the auction manager or merchant, the auction will close 530, and will no longer accept further bidding. The auction winner is determined 535 following auction close 530. To determine the winning bid, the auction middleware 545 queries the auction system 555 for the highest posted bid for the particular auction. This bid is then processed within the transaction settlement phase as illustrated in FIG. 6.

Transaction Settlement Phase: FIG. 6 is a flow chart illustrating the transaction settlement phase where the participant's rewards account is debited, the merchant charges the account manager for the auction item and the account manager settles with the merchant that supplied the auction item.

In an exemplary embodiment, the transaction settlement phase of the present invention is generally the same as traditional financial settlement systems and is well known in the bank and transaction card industry. As such, the present invention contemplates minimal adjustments to existing commercial transaction card processing systems.

Referring back to FIG. 5, when a participant places a bid 500 on an auction item, the auction middleware 545 queries the account manager in order to verify that the bid amount is within the rewards account balance 520. The bid is posted 525 only after verification. Because a period of time will lapse from when the bid is verified until the transaction settlement phase, it is plausible for the participant to expend a balance of his or her rewards account before the transaction and settlement phase. Therefore, referring to FIG. 6, there is a need to again verify the auction winner's rewards account balance 600 by transmitting a request to the auction middleware 650. The auction middleware 650 queries the account manager 655 to determine if the rewards account balance equals or exceeds the original bid amount. If a sufficient balance does not exist in step 605, the auction middleware 650 queries the auction system 660 for the next highest bid 630. A verification request is then transmitted to the auction middleware 650 which then queries the auction system 660 to determine if a minimum bid amount has been set for the auction item and if so, to ensure that the bid amount meets or exceeds the minimum. If the bid is determined to be invalid in step 640, there is no auction winner and there is no further activity at the transaction and settlement phase. If the bid is valid, the new auction winner's rewards account balance is verified 600 by sending a verification request to the auction middleware 650 which then queries the account manager 665. If it is determined that the rewards account does not have a sufficient balance in step 605, then the process repeats to get the next highest bid 630. This process could be repeated until either a valid bid amount with sufficient rewards account balance is found, or until it is determined that there is no auction winner. If there is no auction winner, this result is posted to the website 630.

After verifying that there is a sufficient balance 605 in the participants rewards account to pay the bid amount, a debit is committed to the participant's rewards account 610 in the amount of the bid. The account manager's accounts payable is then credited 615 with this same amount. The account manager's accounts payable is then debited 620 in the amount of the participant's winning bid. The merchant charges the account manager for the item, then the account manager settles with the merchant. When the financial transaction is complete, the results of the auction are posted to the auction website 630.

It should be understood, however, that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method
receiving, by a computer based system for administering an auction, a first bid on a first auction item being auctioned within an auction system, wherein the first bid is associated with a rewards account, wherein the rewards account has a rewards account balance, wherein the rewards account was registered with the auction system, and wherein the auction system manages a plurality of auctions;
confirming, by the computer based system, the rewards account balance is sufficient to cover the first bid;
placing, by the computer based system, the first bid for the first auction item;
receiving, by the computer based system, a second bid on a second auction item being auctioned within the auction system, wherein the second bid is associated with the rewards account,
placing, by the computer based system, the second bid for the second auction item;
monitoring, by the computer based system, the first bid and the second bid, wherein a total bid amount of the first bid and the second bid exceed the rewards account balance;
receiving, by the computer based system, an indication from the auction system that at least one of the first bid is the winning bid for the first item and the second bid is the winning bid for the second item;
reducing, by the computer based system, the rewards account balance by an amount corresponding to at least one of the first bid and the second bid, in response to the indication from the auction system, wherein the account balance is not greater than at least one of the first bid and the second bid which is still pending; and
canceling, by the computer based system, at least one of the first bid and the second bid, in response the receiving the indication from the auction system.

2. The method of claim 1 further comprising:
querying, by the computer based system, the auction system to verify that the auction system accepts the rewards account for payment during participation in the auction;
transmitting, by the computer based system, the account data to the auction system.

3. The method of claim 1 further comprising: querying, by the computer based system, the auction system to verify that the first bid exceeds an amount of any previous bid for the first auction item; querying, by the computer based system, the auction system to verify that the first bid exceeds any minimum bid amount set for at the first auction item; and transmitting, by the computer based system, the first bid to the auction system.

4. The method of claim 1 further comprising:
transmitting, by the computer based system, a credit based on the winning bid amount to a merchant who sold the auction item.

5. The method of claim 1 further comprising providing reward account details and account history data, wherein the account history data-includes at least one of dates and descriptions of items bid on, winning bid amounts, and current bid status.

6. The method of claim 1 further comprising at least one of adding and removing rewards accounts.

7. The method of claim 1, wherein the rewards account is associated with a transaction account.

8. The method of claim 1, wherein the rewards account has a point value which is converted to a monetary value in response to registering the rewards account with the auction system.

9. The method of claim 1, wherein the rewards account has a point value which is converted to a monetary value in response to registering the rewards account with the auction system, wherein the auction system is a third party system operated independently from the computer based system.

10. The method of claim 4, wherein the credit is a monetary value transmitted to the merchant.

11. The method of claim 1, wherein the auction system is operated independently from the computer based system.

12. A tangible computer-readable storage medium having non-transitory computer-executable instructions stored thereon that, if executed by a computer based system for managing auctions, cause the computer based system to perform operations comprising:
receiving, by the computer based system, a first bid on a first auction item being auctioned within an auction system, wherein the first bid is associated with a rewards account, wherein the rewards account has a rewards account balance, wherein the rewards account was registered with the auction system, and wherein the auction system manages a plurality of auctions;
confirming, by the computer based system, the rewards account balance is sufficient to cover the first bid;
placing, by the computer based system, the first bid for the first auction item;
receiving, by the computer based system, a second bid on a second auction item being auctioned within the auction system, wherein the second bid is associated with the rewards account,
placing, by the computer based system, the second bid for the second auction item;
monitoring, by the computer based system, the first bid and the second bid, wherein a total bid amount of the first bid and the second bid exceed the rewards account balance;
receiving, by the computer based system, an indication from the auction system that at least one of the first bid is the winning bid for the first item and the second bid is the winning bid for the second item;
reducing, by the computer based system, the rewards account balance by an amount corresponding to at least one of the first bid and the second bid in response to the indication from the auction system, wherein the account balance is not greater than at least one of the first bid and the second bid which is still pending; and
canceling, by the computer based system, at least one of the first bid and the second bid, in response the receiving the indication from the auction system.

13. A system comprising:
a network interface communicating with a memory;
the memory communicating with a processor; and
the processor, when executing a computer program, is configured to:
receive a first bid on a first auction item being auctioned within an auction system, wherein the first bid is associated with a rewards account, wherein the rewards account has a rewards account balance, wherein the rewards account was registered with the auction system, and wherein the auction system manages a plurality of auctions;
confirm the rewards account balance is sufficient to cover the first bid;
place the first bid for the first auction item;
receive a second bid on a second auction item being auctioned within the auction system, wherein the second bid is associated with the rewards account, place the second bid for the second auction item;
monitor the first bid and the second bid, wherein a total bid amount of the first bid and the second bid exceed the rewards account balance;
receive an indication from the auction system that at least one of the first bid is the winning bid for the first item and the second bid is the winning bid for the second item;
reduce the rewards account balance by an amount corresponding to at least one of the first bid and the second bid in response to the indication from the auction system, wherein the account balance is not greater than at least one of the first bid and the second bid which is still pending; and
cancel at least one of the first bid and the second bid, in response the receiving the indication from the auction system.

* * * * *